A. HERZOG.
TOY CAMERA.
No. 9,878. Reissued Sept. 20, 1881.
Fig. 1.
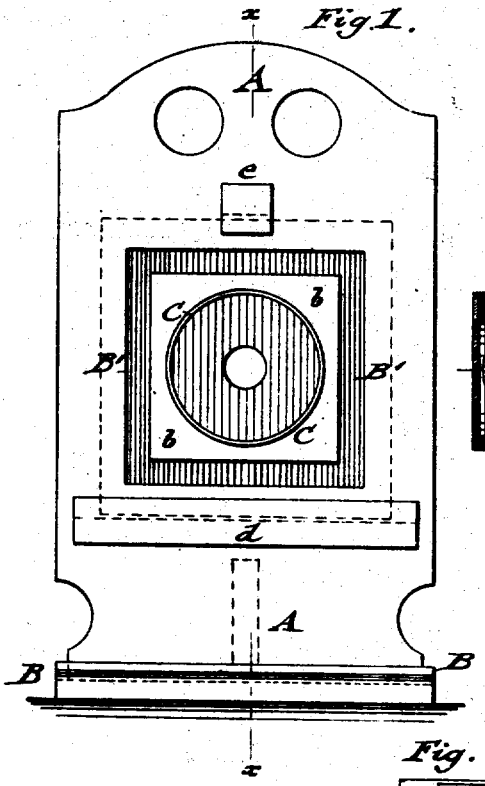
Fig. 2.
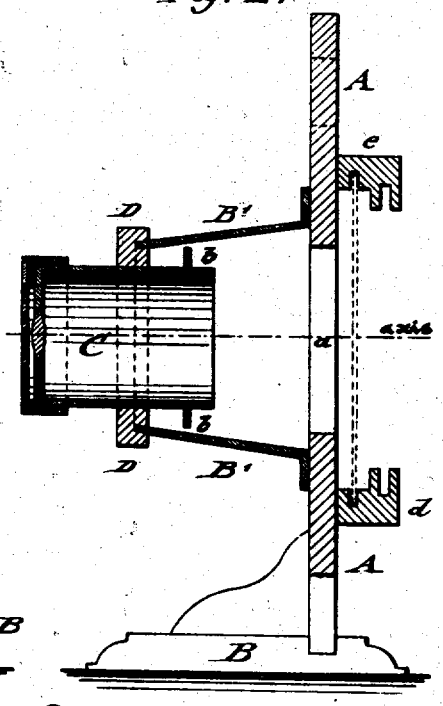
Fig. 3.
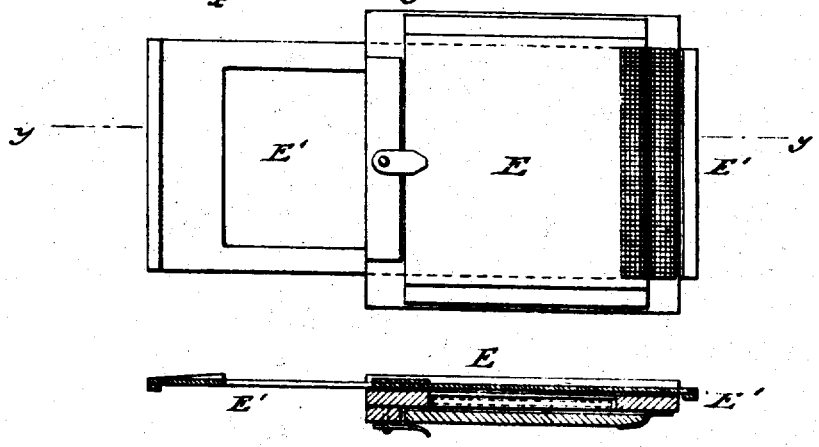
Fig. 4.
WITNESSES:
Carl Kaup
Otto Rusch
INVENTOR
August Herzog
BY Paul Grepe
ATTORNEY

UNITED STATES PATENT OFFICE.

AUGUST HERZOG, OF GUTTENBURG, NEW JERSEY.

TOY CAMERA.

SPECIFICATION forming part of Reissued Letters Patent No. 9,878, dated September 20, 1881.

Original No. 182,117, dated September 12, 1876. Application for reissue filed July 14, 1881.

*To all whom it may concern:*

Be it known that I, AUGUST HERZOG, of Guttenburg, in the county of Hudson and State of New Jersey, have invented a new and Improved Toy Camera, of which the following is a specification.

This invention relates to an improved toy or amateur photographic apparatus, of simple, compact, and cheap construction, which is designed for the instruction and amusement of children and grown people; and the invention consists, essentially, of an upright support or frame provided with an aperture and with a rigid stationary camera and adjustable lens-holding tube in front of and concentrically to the aperture, and with means for supporting the ground glass and plate-holder back of the stand.

In the accompanying drawings, Figure 1 represents a rear elevation; Fig. 2, a vertical longitudinal section on line *x x*, Fig. 1; and Figs. 3 and 4 are, respectively, a front elevation and a horizontal section on line *y y*, Fig. 3, of my improved plate-holder.

Similar letters of reference indicate corresponding parts.

In the drawings, A represents an upright frame or stand, which is securely applied to a horizontal base, B, that may be placed on a light table, tripod, staff, or any other suitable means of support, as found most convenient.

The upright frame A is provided with an aperture, *a*, and at the front side with a conically or pyramidally tapering camera, B′, which is rigidly attached to the stand A. The camera B′ is preferably made of suitable sheet metal and provided with a front frame, D, within which is guided a horizontally-adjustable lens-holding tube, C, that has at its inner end an encircling-flange, *b*, so as to prevent the passage of any rays of light which may enter between the lens-tube C and face-plate D of the camera to the sensitized plate, so that a more perfect camera is obtained. The aperture *a*, camera B′, and lens-holding tube C are arranged concentrically with each other. The rear side of the frame or support A is provided with a grooved horizontal guide-strip, *d*, below the aperture *a*, and with a correspondingly-grooved and recessed top-holder, *e*, for supporting the plate-holder E, which is inserted in front of the ground glass that slides in separate grooves of the strips *d e*. The plate-holder E is provided with a hinged door, through which the sensitized plate is inserted, and with a lateral slide, E′, of about twice the length of the plate-holder, the slide having a recess at one end to be drawn to one side and expose the sensitized plate to the action of the light when the cap is taken off the lens.

The operation of the apparatus is analogous to that of a large-sized apparatus, with this difference, that in the latter a rigid or flexible camera of considerable size is employed, which is arranged between the lens-holding tube or tubes and the means which form the support for the ground glass and plate-holder, while in my apparatus the conically or pyramidally tapering rigid frame B′ forms the camera proper, and serves at the same time as the support for the lens-holding tube. Consequently the whole apparatus becomes smaller and can can be carried and packed without removing the lens-holding tube, as heretofore. It combines, therefore, in a neater and more compact manner, the different parts required for a complete photographic apparatus, so as to form an instructive and entertaining toy for children, while it may also be used by amateurs for many practical and useful purposes.

Having thus described my invention, I claim as new and desire to secure by Letters Patent—

1. A toy photographic apparatus consisting of a supporting frame or stand having an aperture, of a rigid camera carrying an adjustable lens-holding tube secured to the front of the stand, and of grooved strips for supporting the plate-holder and ground glass, arranged at the back of the stand, all substantially as and for the purpose set forth.

2. A toy photographic apparatus consisting of the support A B, having an aperture, *a*, a rigid camera, B′, secured around the aperture at one side of the stand, and provided with an adjustable lens-holding tube, C, arranged concentrically with the aperture and camera, and of grooved strips respectively above and below the aperture, at the opposite side of the stand, for the support of the plate-holder and ground glass, substantially as set forth.

3. In a toy photographic apparatus, the combination of a supporting-stand, A B, having an aperture, *a*, and grooved strips *e* and *d* respectively above and below the aperture, with a stationary camera, B′, having a front frame, D, and with an adjustable lens-holding tube, C, having an interior flange, *b*, substantially as shown and described.

4. In a toy photographic apparatus, the combination of a support, A B, having a rigid camera, B′, front frame, D, and horizontal adjustable lens-holding tube C at one side of the support, with grooved supporting-strips *d e* and a plate-holder, E, at the back of the support, substantially as specified.

In testimony that I claim the foregoing as my invention I have signed my name, in presence of two witnesses, this 7th day of July, 1881.

AUGUST HERZOG.

Witnesses:

PAUL GOEPEL,

CARL KARP.